United States Patent [19]

Van der Donk et al.

[11] Patent Number: 6,024,225
[45] Date of Patent: Feb. 15, 2000

[54] CHAIN OF ELASTIC BANDS, METHOD AND INSTALLATION FOR THE PRODUCTION OF A CHAIN OF ELASTIC BANDS AND METHOD AND INSTALLATION FOR FEEDING ELASTIC BANDS FROM THE CHAIN OF ELASTIC BANDS TO A HANDLING INSTALLATION

[75] Inventors: Cornelis Henricus Jozef Van der Donk, Soesterberg; Gerardus Dietz, Utrecht, both of Netherlands

[73] Assignee: Terpo Holding B.V., Soesterberg, Netherlands

[21] Appl. No.: 08/776,640

[22] PCT Filed: Sep. 26, 1995

[86] PCT No.: PCT/NL95/00324

§ 371 Date: Feb. 5, 1997

§ 102(e) Date: Feb. 5, 1997

[87] PCT Pub. No.: WO96/09920

PCT Pub. Date: Apr. 4, 1996

[30] Foreign Application Priority Data

Sep. 26, 1994 [NL] Netherlands ............................ 9401561

[51] Int. Cl.⁷ ...................................................... B65B 13/30
[52] U.S. Cl. .................................. 206/805; 83/13; 83/19; 83/39; 83/52; 100/9; 206/820
[58] Field of Search ................................. 100/9; 206/805, 206/820; 83/13, 19, 39, 52

[56] References Cited

U.S. PATENT DOCUMENTS

| | | | |
|---|---|---|---|
| 3,164,250 | 1/1965 | Paxton | 206/56 |
| 3,572,396 | 3/1971 | Hoffman et al. | 138/178 |
| 3,579,955 | 5/1971 | Gunyou et al. | 53/138 |
| 4,060,015 | 11/1977 | Gros | 83/19 |

FOREIGN PATENT DOCUMENTS 2169022  9/1973  France .

*Primary Examiner*—Peter O'Sullivan
*Attorney, Agent, or Firm*—Young & Thompson

[57] ABSTRACT

A chain of elastic bands (1) includes at least two elastic bands (3), wherein adjacent elastic bands are joined to one another by means of at least one bridging piece (4). The longitudinal direction (A) of the elastic bands preferably extends transversely to the longitudinal direction (C) of the chain of elastic bands (1). The chain of elastic bands may be produced from a flat, sheet-like web of elastic material (9), such as rubber, preferably natural rubber, in which essentially oval elastic bands (3) have been formed. The elastic bands have a constant width (B) all round. Adjacent elastic bands are preferably joined to one another by at least two bridging pieces (4), which are preferably each arranged at a transition between the adjacent longitudinal strips (5) and arc-shaped strips (6). The chain of elastic bands according to the invention can be rolled up into a roll or can be folded up to form a harmonica-like stack. Chains of elastic bands of this type can be produced, for example, from rubber which is still in the unvulcanized state or from an elastic plastic.

27 Claims, 5 Drawing Sheets

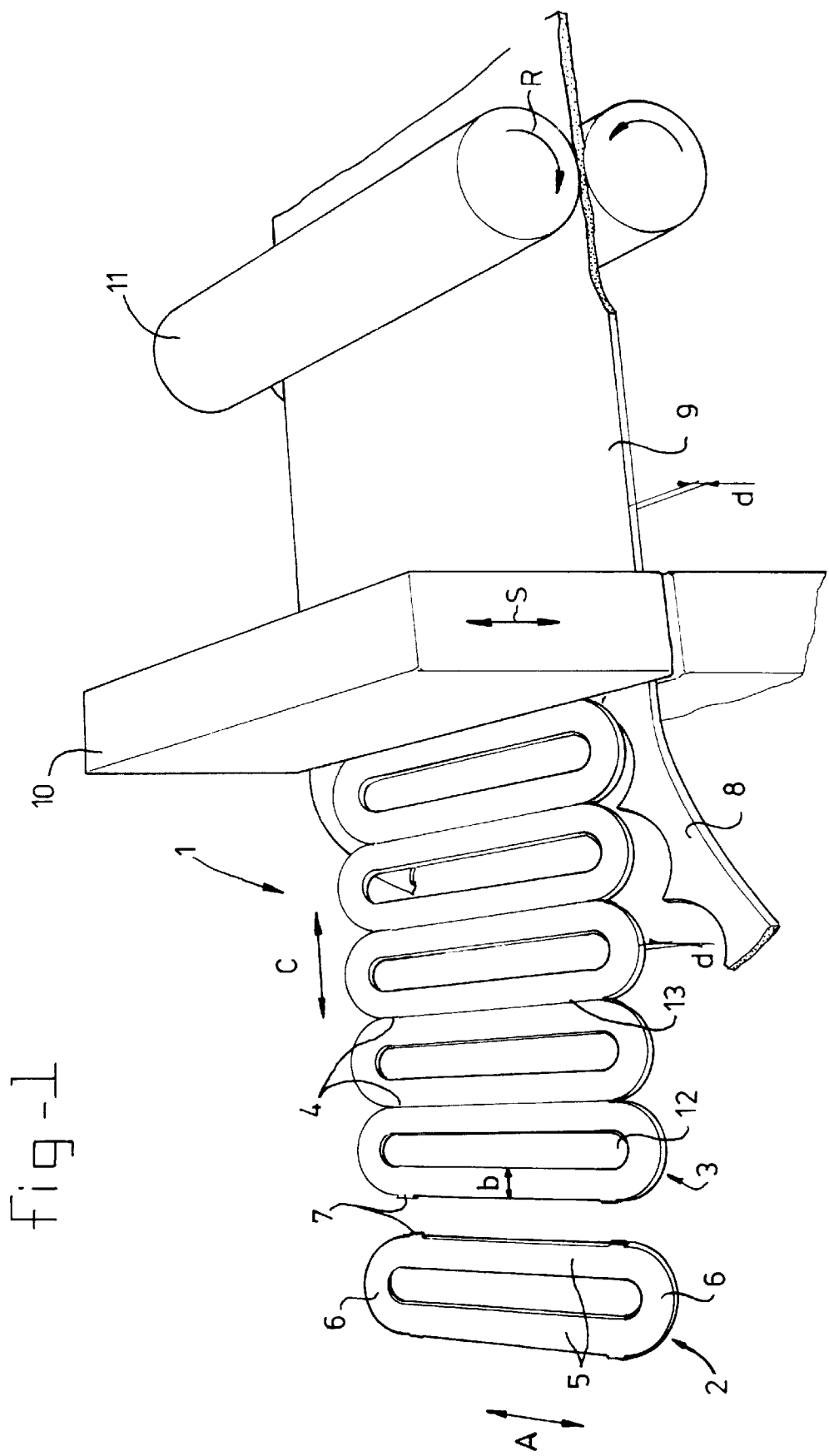

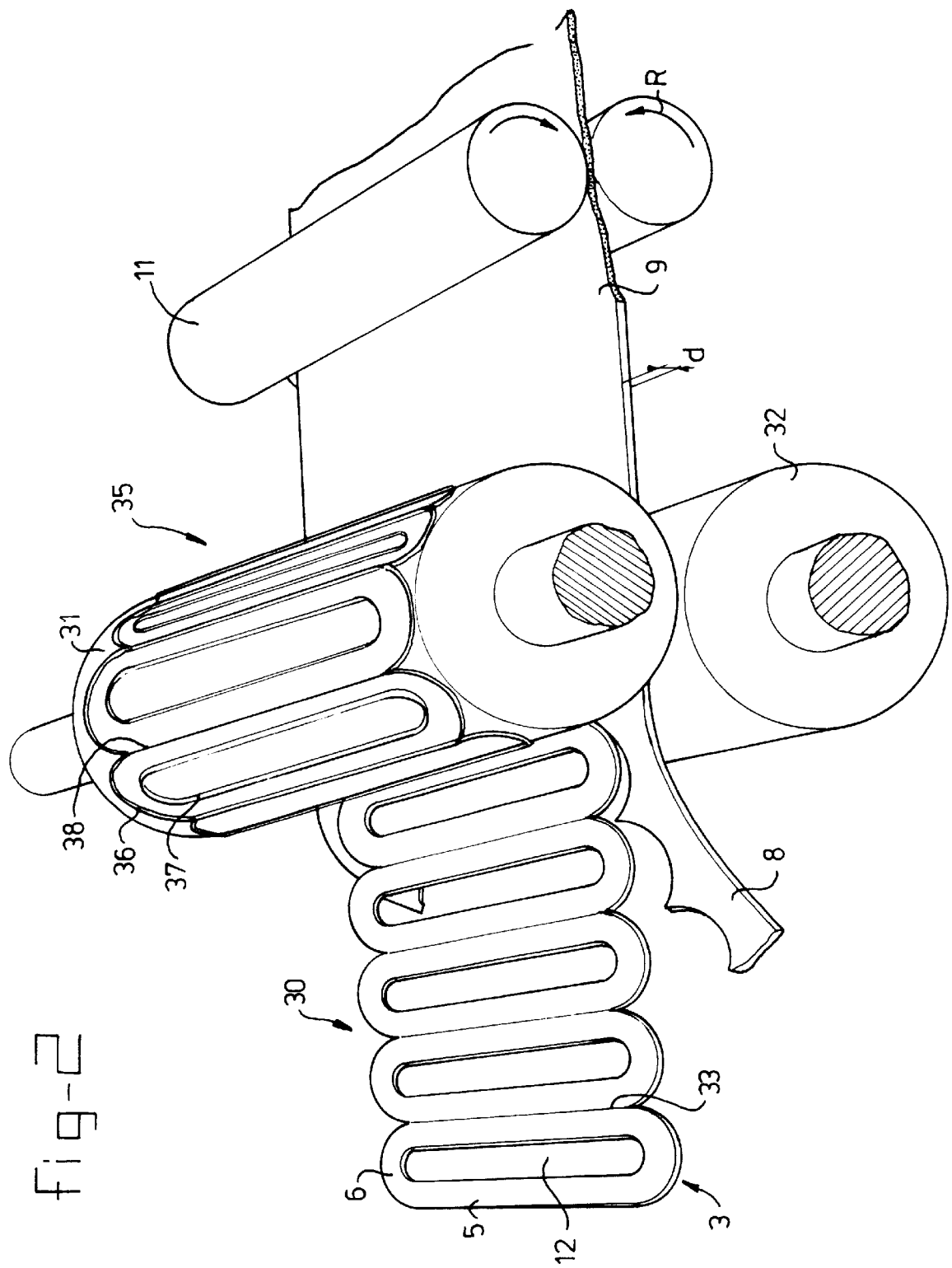

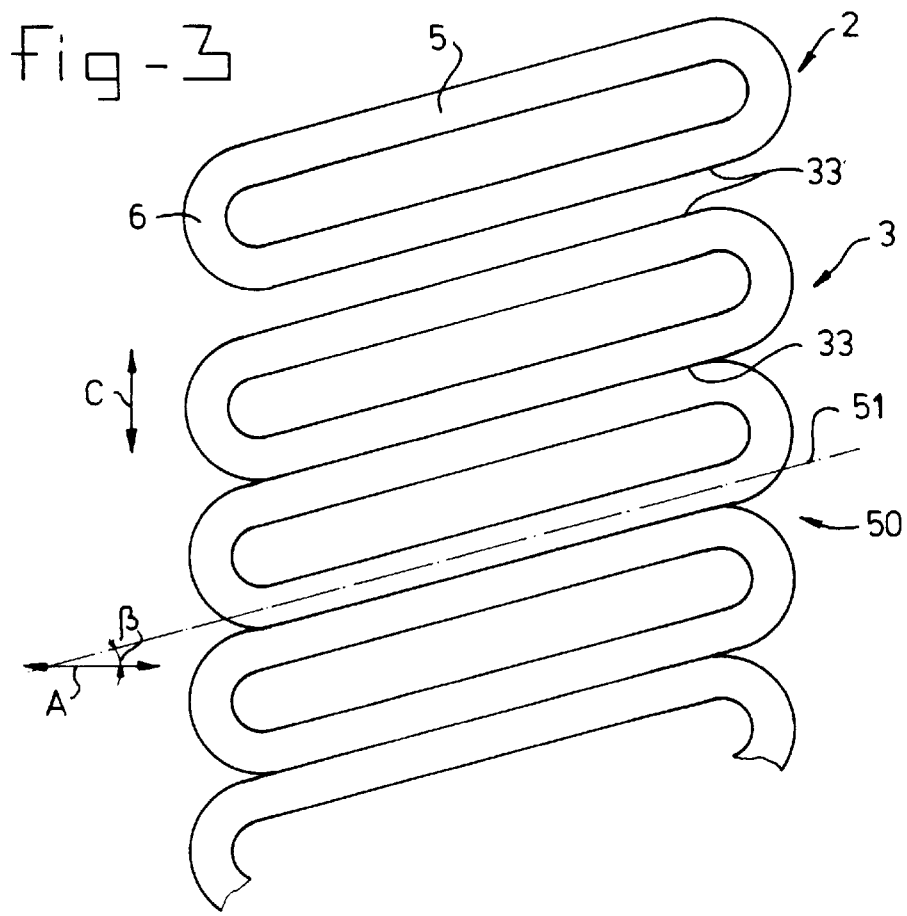
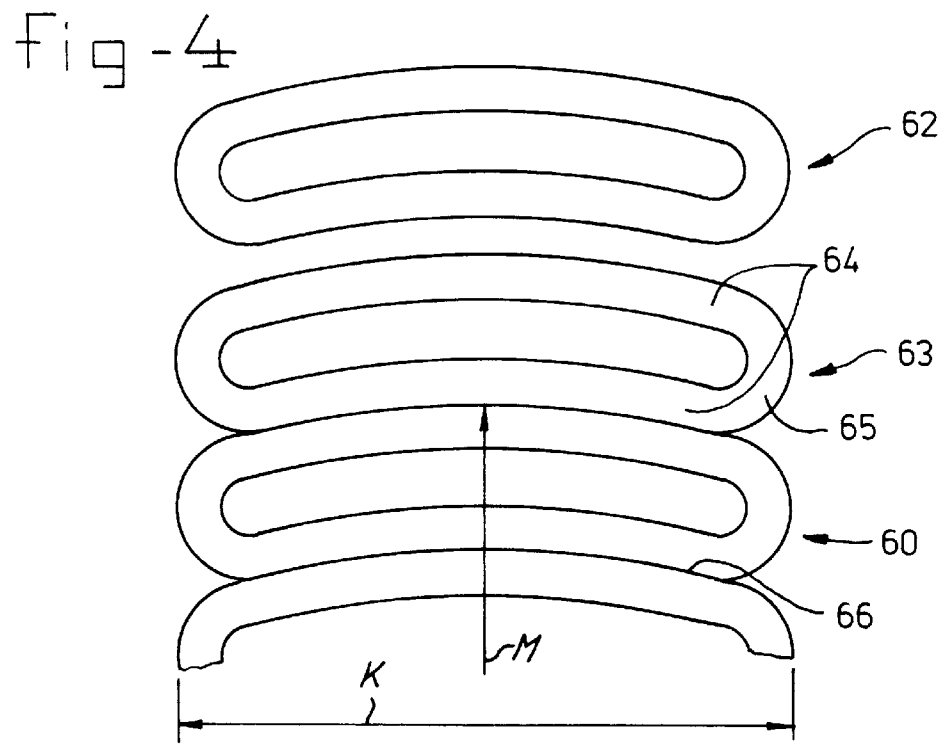

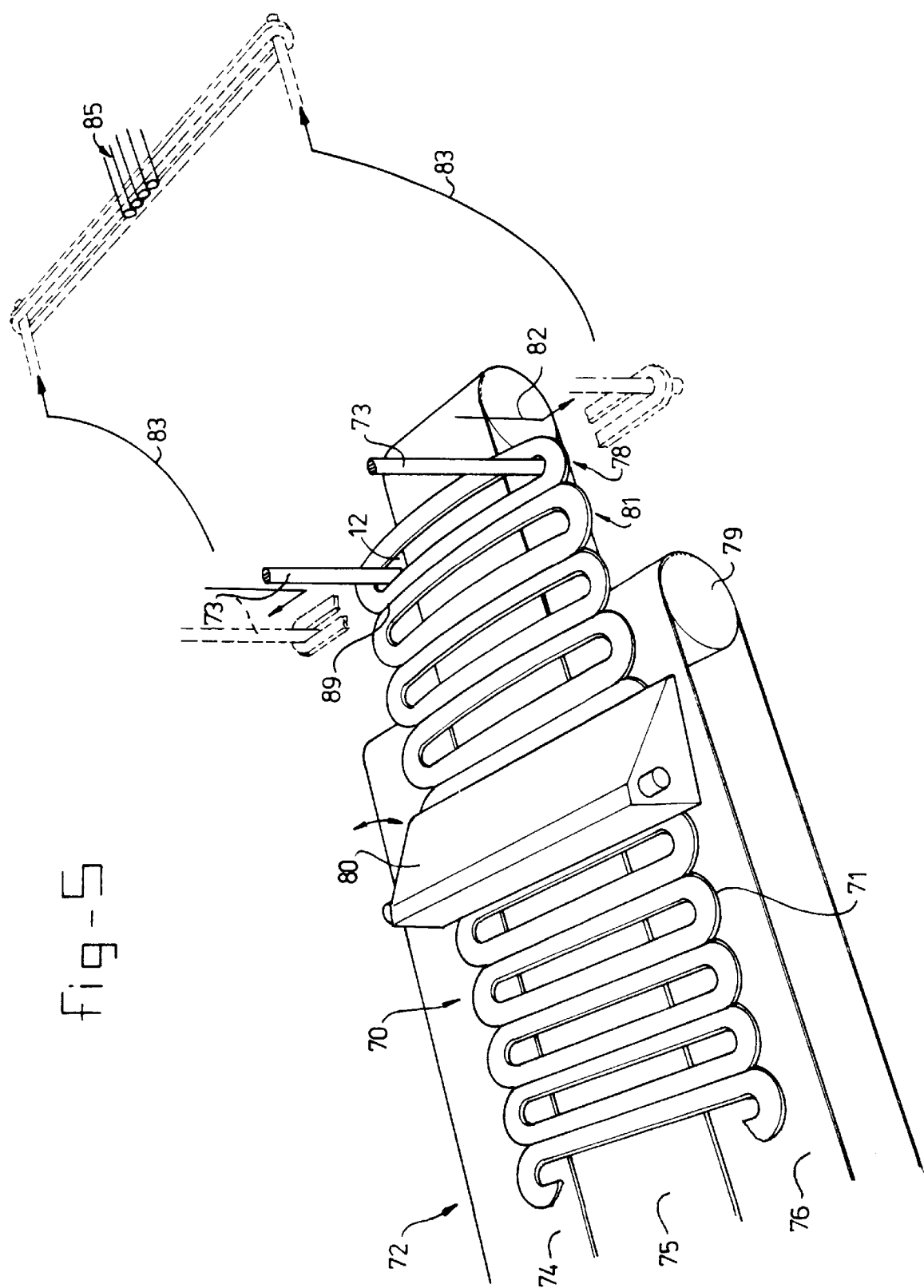

6,024,225

CHAIN OF ELASTIC BANDS, METHOD AND INSTALLATION FOR THE PRODUCTION OF A CHAIN OF ELASTIC BANDS AND METHOD AND INSTALLATION FOR FEEDING ELASTIC BANDS FROM THE CHAIN OF ELASTIC BANDS TO A HANDLING INSTALLATION

This application is a 371 of PCT/NL95/00324 filed Sep. 26, 1995.

BACKGROUND OF THE INVENTION

The present invention relates to a chain of elastic bands, comprising a multiplicity of elastic bands.

It is known from U.S. Pat. No. 4,060,015 to produce elastic bands from a long narrow strip of rubber rolled up on a roll. In a first station a slit which extends in the longitudinal direction of the strip is punched in the strip and in a second station elastic bands are cut off from the strip by means of a further punching device, which cuts through the strip between two longitudinal slits. A handling installation with movable fingers for spreading apart the elastic band cut off by the second station is arranged downstream of the second punching station.

An installation of this type, as described in U.S. Pat. No. 4,060,015, can be located directly upstream of a packing installation, the fingers then supplying the spread-open elastic band directly to the packing installation. This implies that a relatively complex punching device, which is susceptible to malfunction and often is expensive, for punching elastic bands from the strip has to be arranged by every packing installation. It is also possible to produce the elastic bands beforehand and to supply these from a storage container to a packing installation. In this case, however, the packing installation must be provided with a complex set of fingers, gripper elements, etc., in order to take the elastic bands, which are stored in random fashion, from the storage container and then to spread these open and stretch them around one or more desired articles.

U.S. Pat. No. 3,572,396 discloses a chain of elastic bands which consists of a rubber, oval tube which has incisions in the transverse direction at regular intervals in such a way that only two connections remain in the longitudinal direction. The tube is essentially oval with two parallel flat sides which are connected to one another by curved end sections. A chain of elastic bands of this type is produced by feeding a tube of elastic material to a cutting block, pressing the tube flat on said block and then cutting into the tube down to the block using a blade. However, a chain of elastic bands of this type has the disadvantage that when cutting into the tube the parts thereof which are pressed onto one another easily stick together, as a result of which the elastic bands no longer fall open by themselves. This leads, in turn, to malfunctions when a chain of elastic bands of this type is used in an automatic packing installation as a pre-determined fixed positioning of elastic bands is no longer guaranteed. According to said U.S. Pat. No. 3,572,396, the feed to a bundling installation takes place from a magazine in which the tubular chain of elastic bands is stored vertically. Each time, the lowermost elastic band is rotated through 90°, after which it can be gripped by fingers and pulled from the tube. This rotation through 90° and subsequent gripping is highly susceptible to malfunctions if the elastic band is not correctly positioned. This is the case, for example, when sticking together has occurred or when the tube has not been cut through to an adequate extent, as a result of which the tilting movement of the lowermost elastic band is impeded. A further malfunction factor is that not only the lowermost elastic band but also the lowermost two or even more elastic bands can be rotated through 90° and then would be fed to the fingers simultaneously.

Furthermore, German Offenlegungsschrift 2 223 759 discloses annular packaging elastic bands made of rubber, which elastic bands are connected to one another in chain form and are separable from one another. As in the case of the abovementioned U.S. Pat. No. 3,572,396, here too the chain of elastic bands is produced from a rubber hose which is cut into in the transverse direction and at intervals. The problem of elastic bands sticking together again arises in this case as well. In order to form the chain of elastic bands, the hose is pressed flat and then cut through except for a small section. In this case, the section which is not cut through provides a connection to an adjoining elastic band. The section which is not cut through is always located at an opposing side to the previous one, so that a chain of elastic bands which is, as it were, harmonica-shaped is formed after cutting into the rubber tube. Said harmonica-like chain of elastic bands can be converted into a long chain of successive elastic bands by completely unfolding the harmonica-like chain. Said drawn out chain of elastic bands can then be wound onto a roll, after which the elastic bands can be torn off from the roll one-by-one for use. Stresses are introduced into the chain of elastic bands both when unfolding the harmonica-like chain and during the subsequent rolling up onto the roll, as a result of which the elastic bands will lose elasticity during storage of the chain on a roll. When the chain of elastic bands is rolled up onto the roll, the elastic bands are pulled closed, so that the fingers of an automatic bundling installation would not be able to be inserted into the elastic bands, or would be able to be inserted only with difficulty and in an unreliable manner. The chain of elastic bands disclosed in German Offenlegungsschrift 2 223 759 is therefore not suitable for use for automatic packing installations.

Furthermore, many installations are disclosed in the prior art with which elastic bands are produced by cutting these off from a hose and then supplying them to a packing installation. In order to be able to operate without malfunctions, it is necessary that an open elastic band is supplied to the spreader mechanism. However, the problem with this simple cutting method, which is necessarily used, is that the elastic bands stick together and consequently do not fall open.

SUMMARY OF THE INVENTION

The aim of the present invention is to provide a solution to the abovementioned problems, amongst others.

A further aim of the present invention is to provide and to produce a chain of elastic bands from which the elastic bands can be fed easily, reliably and with accurate positioning to a handling installation, such as a packing or bundling installation.

The provision of a chain of elastic bands is achieved in that adjacent elastic bands are joined to one another by means of at least one connection to one another. Such a chain of elastic bands according to the invention comprises a chain, which in principle is of unrestricted length, of elastic bands which are located next to one another and are joined to one another by means of connections. A chain of elastic bands of this type can be produced in a simple manner by cutting out said chain from a sheet of elastic material, such as natural rubber, synthetic rubber or another plastic, and, furthermore, as a result of the chain form, can easily be fed to a handling installation, such as a packing or bundling installation. In the handling installation, at each feed the front elastic band of the chain can, for example, be gripped, in order then to be pulled away from the chain and separated from the latter because the breakable or tearable connections between adjacent elastic bands break down. However, it is also possible to cut through the connections between the front and the second elastic bands and thus to separate the front elastic band from the chain in order to be able to feed said elastic band to a handling installation.

A major advantage of a chain of elastic bands according to the invention is that the elastic bands in such a chain of elastic bands can be fed in a known, predetermined, reproducible orientation to the handling installation, which makes handling of the elastic bands appreciably simpler, less susceptible to malfunction and more reliable.

The length of the connections between adjoining elastic bands can vary from 0 to, in principle, infinity. Preferably, however, the length of the connections will be limited and no more than 5 mm. Connections with a length of 0 mm have proved highly advantageous since in that case hardly any traces of the connection remain after an elastic band is pulled off the chain. When the connections have to be cut through in order to separate elastic bands from the chain of elastic bands, positioning of a connection beneath a blade can be facilitated if the connections are of some length. In this case, a double-acting blade can optionally be used which cuts away the entire connecting section in a single stroke, so that no further remnants of this connection remain in this case. In order to prevent undesirable sticking together of adjacent elastic bands, it can be advantageous in the case of certain materials used to form the elastic bands if the connections provide at least a slight gap of about 1 mm between adjoining elastic bands.

According to the invention it has been found to be advantageous if the longitudinal direction of the elastic bands extends essentially transversely to the longitudinal direction of the chain of elastic bands. The chain is then of handy dimensions, as a result of which the chain can be rolled up in a practical way. Such an orientation of the elastic bands also has the effect that the extension of the front elastic band of the chain remains as small as possible when said front elastic band is pulled off the chain. In this context, "essentially transversely" is taken to mean that the respective longitudinal directions are also able to intersect one another at an angle which is not equal to 90°, such as, for example, at an angle of 70° to 75°.

The elastic bands in the chain of elastic bands according to the invention are preferably formed from two parallel longitudinal strips located some distance apart, which strips are joined to one another at their ends by two curved strips in the shape of a circular arc. Elastic bands of this type, which are essentially oval, inherently have an open middle passage, which appreciably facilitates processing of the elastic bands and the chain of elastic bands in a handling installation. Any fingers and the like can easily be inserted through said middle passage.

According to an advantageous embodiment, the longitudinal strips are straight and the longitudinal axis of each longitudinal strip intersects the transverse direction of the elastic bands at an angle of about 0° to 10°, preferably about 0° to 5°. A chain of elastic bands of this type, which has elastic bands in a slightly oblique orientation, can easily be cut out from a sheet of elastic material by means of a cutting and pressure roller pair. In this case, the cutting blades on the cutting roller are slightly oblique with respect to the axis of rotation of the cutting roller, as a result of which the cutting effect of the cutting blades is improved. If the cutting blades run precisely parallel to the axis of rotation of the cutting roller, the cutting blades will essentially be pressed into the sheet, in which case the cutting effect thereof is not utilised to the maximum. As a consequence of this, sections which are incompletely cut through are more likely to arise, which can lead to problems during subsequent use of the chain of elastic bands.

Instead of a slightly oblique orientation of the elastic bands with respect to the chain of elastic bands, the longitudinal strips can also be arc-shaped and can be arranged such that the longitudinal strips of adjacent elastic bands run parallel.

In the case of larger radii of curvature, elastic bands of this type with arc-shaped longitudinal strips can also be regarded as essentially oval elastic bands.

According to an advantageous embodiment of the invention, adjacent elastic bands are joined to one another at at least two connection points, said connection points preferably being located at a transition between the adjacent longitudinal strips and arc-shaped strips. In the case of the oval elastic strips discussed above, said connection points are then arranged at a transition between the adjacent longitudinal strips and arc-shaped strips. A chain of elastic bands of this type can be fed easily to a handling installation and easily processed by the latter, deformations of the chain of elastic bands because a pull is exerted on the latter being kept to a minimum since the connections are located as closely as possible to the longitudinal sides of the chain of elastic bands.

Especially in the case of broader chains of elastic bands, that is to say longer elastic bands, it can be advantageous if there is a third connection point between the centres of the adjacent longitudinal strips of two adjacent elastic bands. Even more connection points can optionally also be arranged between longitudinal strips of adjacent elastic bands.

According to the invention, each connection or connection point can comprise a multiplicity of thread-like connecting sections. Thread-like connecting sections of this type can, for example, be obtained by providing the cutting blades, used to produce a chain of elastic bands from a sheet, with small notches. When the sheet is cut through, said small notches leave behind small connecting threads between adjacent elastic bands, as a result of which the elastic bands can subsequently easily be separated from the chain of elastic bands.

According to another advantageous embodiment, the connection between two adjacent elastic bands comprises a pre-formed tear line. A tear line of this type is understood to be a locally weakened region, which tears or breaks easily. In this case, the connection can consist of a bridging piece with a local constriction or attenuation. However, according to the invention it can also be highly advantageous if the connection itself consists of a tear line formed between two adjacent longitudinal strips of adjacent elastic bands. In this case the connection will have a length of 0 mm, so that adjacent elastic bands are in contact with one another with their adjacent longitudinal strips connected by a tear line. In this case, the tear line will generally consist of a cut, through the chain of elastic bands, which is incomplete viewed in the direction perpendicular to the chain of elastic bands.

The chain of elastic bands according to the invention advantageously comprises a flat, sheet-like web of elastic material in which the elastic bands have been formed.

The elastic bands in the chain of elastic bands are preferably of such a shape that they have a constant width all round. Elastic bands of this type have a more pleasing appearance when they are stretched and have no narrower sections which would be subjected to greater load on stretching and consequently form potential locations for breaking or tearing of the elastic band.

A chain of elastic bands according to the invention can advantageously be rolled up into a roll. A roll of this type is very suitable for feeding elastic bands to a handling installation.

According to a further advantageous embodiment, the chain of elastic bands is folded up in a harmonica-like manner to form a stack. Such a stack can be placed in, for example, a cassette and serve as feed for elastic bands to a handling installation.

The invention also relates to an elastic band from a chain of elastic bands according to the invention. An elastic band of this type can be recognised, inter alia, by the cut or break faces of the broken connections.

The invention also relates to a method for the production of a chain of elastic bands according to the invention, comprising the following steps:

feeding the sheet of elastic material to a cutting device; and cutting out a multiplicity of elastic bands, joined by connections to form a chain, from the sheet using the cutting device.

The chain of elastic bands according to the invention can easily be cut out from a sheet of elastic material with the aid of, for example, a punching device or a pair of rollers comprising a cutter roller and a pressure roller interacting therewith. The elastic material used can be, for example, natural rubber, synthetic rubber or another elastic plastic.

In this context, the connections can advantageously be formed by partially cutting through the sheet in the direction perpendicular thereto, at the location of a boundary line between two adjacent elastic bands. In this way, the sheet is just not completely cut through, so that a chain of elastic bands is obtained, the incomplete cut-throughs in which form local attenuations where the chain will tear or break when forces are exerted thereon. A chain of this type can easily be separated into individual elastic bands by a separating device.

However, the connections can also be formed by leaving free the bridging pieces between two adjacent elastic bands. Said bridging pieces can optionally also be provided with a so-called tear line, by partially cutting through such a bridging piece. In this context, a bridging piece is understood to be a connection which has a length greater than 0 mm, so that adjacent elastic bands are located next to one another some distance apart.

An easily breakable connection between adjacent elastic bands of a chain of elastic bands can be achieved in a simple manner according to the invention by providing the cutting blades for cutting through the boundary line between two adjacent elastic bands with notches in such a way that thread-like connecting sections are formed at the location of the connections. When notches of this type are used in a cutting device which has a so-called roller pair, high production speeds can be achieved, but it will be clear that such notches can also be used in the case of a punching device.

In the case of a cutting device which has a so-called roller pair, a reliable, readily separable connection between adjacent elastic bands of a chain of elastic bands and a high production speed can be achieved according to the invention if at least a section of each cutting blade for cutting the boundary line between two adjacent elastic bands has a smaller cutting depth with respect to the other cutting blades, such that the sheet is not completely cut through at the location in the cutting blade which has the smaller cutting depth.

When cutting rollers of this type are used, sheets of different thickness can be processed to produce readily separable, reliably functioning chains of elastic bands with the aid of one and the same roller pair without changes having to be made in the settings thereof.

The sheet of elastic material can advantageously be produced by means of an extrusion device, downstream of which the sheet produced can be fed virtually directly from the extrusion device to the cutting device. With a combined extrusion and cutting process of this type, interim storage of pre-formed sheets of elastic material is superfluous.

In this context, it is particularly advantageous according to the invention if the waste produced during cutting out is fed back to the extrusion device. With this arrangement waste material is re-used, which results in appreciable savings in material. Especially when plastics are used to produce the elastic sheet, the waste can be re-processed without any problem. For example, it is possible to feed this waste to the extrusion device and to extrude it again. However, if natural rubber is used, the cutting waste can not be simply re-used. After all, when elastic bands are produced from natural rubber, the extrusion takes place before vulcanisation. As is known, vulcanised rubber can not simply be extruded again. However, this problem can be overcome according to the invention by producing the chain of elastic bands in unvulcanised form from the extruded sheet. It is then possible to re-use the waste produced, which is still in unvulcanised form. It will be clear that this offers considerable economic advantages compared with production of the chain from a (vulcanised) rubber sheet.

According to the invention, a conveyor belt can advantageously be used for rolling up the chain of elastic bands produced to form a roll. With this arrangement, the friction between the conveyor belt and the chain of elastic bands produced prevents the relatively limp chain of elastic bands from being stretched during rolling up, which, especially in the case of considerable stretch, can lead to difficulties during subsequent operations with the chain of elastic bands.

The invention also relates to a method for producing a chain of elastic bands according to the invention.

As indicated above, the invention also relates to a method for feeding elastic bands from a chain of elastic bands according to the invention to a handling installation. A method of this type preferably comprises the following steps:

unrolling the chain of elastic bands from a roll;

feeding the unrolled section of the chain of elastic bands by a conveyor belt to a separating device;

clamping a section of the chain of elastic bands located upstream of the front elastic band;

gripping the front elastic band by means of a separating device and then separating said front elastic band from the chain of elastic bands; and transferring the separated elastic band from the separating device to the handling installation.

As a result of the friction between the conveyor belt and the unrolled section of the chain of elastic bands, stretching during unrolling of the chain of elastic bands is counteracted, as a result of which the positional accuracy of the unrolled section of the chain of elastic bands is improved, which decreases the risk of faltering. In order to be able to separate the front elastic band from the chain of elastic bands, a section of the chain of elastic bands located upstream of the front elastic band is clamped to prevent movements thereof and, thus, changes in position.

Preferably, unrolling and transport by the conveyor belt takes place stepwise, in such a way that the chain of elastic bands, viewed in the longitudinal direction thereof, is always moved over a distance corresponding to the space taken up by an elastic band, viewed in the longitudinal direction of the chain of elastic bands. This prevents a build-up of the chain of elastic bands taking place before the clamping point during clamping of an upstream section of the chain of elastic bands. It is pointed out that a build-up of this type can also be prevented by allowing the means used for clamping to move with the moving chain of elastic bands. However, this solution makes the installation more complex, and thus more expensive.

Preferably, the front-but-one elastic band of the chain of elastic bands is clamped after each stepwise movement, after which the separating device separates the front elastic band from the chain of elastic bands.

During this separation, the front elastic band can advantageously be held taught in the direction essentially transverse to the longitudinal direction of the chain of elastic bands. By said tensioning in the transverse direction, a tearing effect of the attenuated connection can be initiated. When the front elastic band is subsequently pulled off the chain of elastic bands, the extension in the longitudinal direction of the chain will, moreover, be shorter with this arrangement.

Advantageously, the front elastic band is pulled away when separation takes place from the clamped chain of elastic bands. As a result of the attenuated connection, the material of the chain of elastic bands will easily break and/or tear at the location of the connection(s) during this operation. During this pulling away, the front elastic band can first be tensioned somewhat in the transverse direction in order to prevent the elastic band falling off the pins after said elastic band has been broken off and/or torn off from the chain. However, if the elastic band to be separated off is stretched too far in the transverse direction of the chain, the tearing effect can lead to incorrect tearing in the elastic band.

According to the invention, it is furthermore advantageous if the conveyor belt comprises a number of parallel endless conveyor belts which together transport the chain of elastic bands, the outermost conveyor belts of which are shorter than the innermost conveyor belts at the end located downstream. The front elastic band will then protrude freely on either side of the innermost conveyor belts, as a result of which said front elastic band can easily be gripped by the separating device. For the purposes of said gripping, the separating device advantageously comprises two pins which can be inserted through the front elastic band and which preferably are movable with respect to one another. Said pins can be inserted through the front elastic band, preferably on either side of the innermost conveyor belts.

The invention also relates to a device for feeding an elastic band from a chain of elastic bands according to the invention to a handling installation.

The invention also relates to the use of a chain of elastic bands according to the invention in a packing installation, such as a bundling installation. A bundling installation of this type can serve, for example, for bundling bunches of flowers, stacks of paper, and many other products.

The use of the chain of elastic bands according to the invention, or elastic bands from said chain, in handling installations of this type has the great advantage that the functioning of the handling installations becomes appreciably more reliable since positioning problems with regard to the elastic bands can be eliminated virtually completely, so that elastic bands can be fitted around articles many times in succession without faltering.

It will be clear that the elastic bands can also be separated from the chain of elastic bands according to the invention by cutting through the connections at each feed. Said cutting through can take place in diverse ways. Positioning problems during further processing of the elastic bands can be virtually completely eliminated with this type of separation as well, since the elastic band is fed to the handling installation in a known orientation with a high degree of reproducibility.

BRIEF DESCRIPTION OF THE DRAWINGS

The invention will be explained in more detail below with reference to an illustrative embodiment shown in the drawing. In the drawing:

FIG. 1 shows, diagrammatically, a chain of elastic bands according to the invention and a punching device, shown diagrammatically, for producing such a chain of elastic bands;

FIG. 2 shows, diagrammatically, a chain of elastic bands according to the invention and a roller pair, shown diagrammatically, for producing such a chain of elastic bands;

FIG. 3 shows a further embodiment of a chain of elastic bands according to the invention;

FIG. 4 shows yet a further embodiment of a chain of elastic bands according to the invention;

FIG. 5 shows, diagrammatically, an installation for feeding elastic bands from a chain of elastic bands according to the invention to a handling installation;

DESCRIPTION OF THE PREFERRED EMBODIMENT

Figure 6:
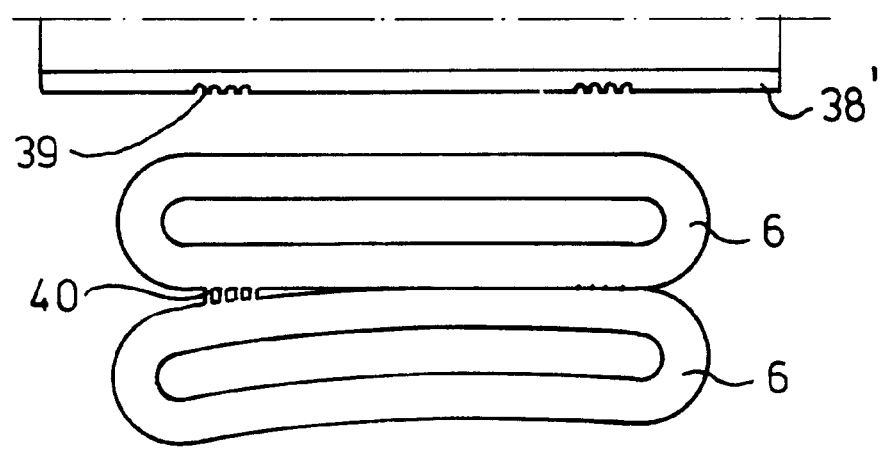
FIG. 6 shows, diagrammatically, an embodiment of a connection between two adjacent elastic bands.

FIG. 1 shows a chain of elastic bands 1 with 5 elastic bands 3 joined by connections 4, and a front elastic band 2 which has been detached. Adjacent elastic bands are joined to one another by means of two connections 4. Each elastic band has a punched-out passage 12 and the separating line 13 of two adjacent elastic bands 3, which is located between two connections 4, is a narrow slit extending through the entire thickness d of the elastic bands.

The longitudinal direction A of the elastic bands extends transversely to the longitudinal direction C of the chain of elastic bands 1. The elastic bands are made up of two parallel longitudinal strips 5 which are located some distance apart and are joined to one another at their ends by two curved strips 6 in the shape of a circular arc. The elastic bands have a constant width b all round.

Making the passage 12 between two longitudinal strips of an elastic band sufficiently wide ensures that the elastic bands are easy to use and handle in further installations, such as, for example, a handling installation for bundling products or a separating device according to the invention, which will be discussed below.

The front elastic band 2 is shown after it has been detached, the remnants of the connections 4 being indicated by 7.

10 indicates a punching device, shown diagrammatically, to which a sheet 9 of elastic material is fed by means of rollers 11 rotating in the direction of the arrows R. Said elastic material can be plastic but can also be natural rubber, which then is preferably in the unvulcanised state.

The punching device 10, which moves up and down as shown by arrow S, can punch out the passage 12, the slits 13 and arc-shaped strips 6 in a single operation. However, it is also conceivable for this to be carried out in, for example, 2 steps. The slits 13 can then, for example, be punched out first and the arc-shaped strips 6 and passages 12 only in a second step. These operations can optionally be carried out simultaneously by means of two punching stations operating simultaneously. The waste strips 8 which are left over on punching can very easily be removed as a single piece, as a result of which jamming of, for example, the punching device is prevented.

When punching from unvulcanised rubber, the connections 7 will preferably be bridging pieces of a length such that the slits 13 will not be filled in by material flow.

FIG. 2 shows a chain of elastic bands 30 which is produced by means of a roller pair 35, which consists of a cutting roller 31 and a counter-roller 32 interacting therewith. The chain of elastic bands 30, like the chain of elastic bands 1 in FIG. 1, consists of essentially oval elastic bands with a cut-out 12 which is delimited by longitudinal strips 5 and arc-shaped strips 6.

The sheet of elastic material is optionally fed with the aid of guide rollers 11 to the roller pair 35. With this arrangement, the cutting roller 31 is provided with blades 37, for producing the cut-out 12, with blade sections 36, for cutting the outer bend of the arc-shaped strip 6, and with blades 38, for cutting the boundary line between adjacent elastic bands 3.

Roller pairs similar to roller pair 35 are generally known from the prior art and are widely used for, for example, cutting products from cardboard and paper. The functioning of such a roller pair, in particular the interaction between the cutting roller and the counter-roller, can therefore be assumed to be generally known.

According to the invention, a cutting blade for the peripheral contour of the elastic bands can consist of two different blade sections (or of four blade sections if greater accuracy is desired). The first blade section relates to blade 36 for the outside bend of the arc-shaped strip, and the second blade section relates to blade 38 for the boundary line between two adjacent elastic bands. In this context, according to another embodiment of the invention, blade section 38 is constructed with a smaller cutting depth than blade section 36 and blade 37. As a result, the boundary line 33 between adjacent elastic bands is not cut through completely but, for example, to more than 90% of the thickness d of the sheet 9 of elastic material. With this arrangement, the part of the boundary line 33 which has not been cut through forms an attenuation, which easily tears and/or breaks in the device which will be described below for feeding elastic bands from a chain of elastic bands according to the invention to a handling installation.

It will be clear that elastic bands joined with the aid of connections 7 to form a chain of elastic bands can also be produced with the aid of a roller pair according to FIG. 2. A cut-out will then be made between cutting blade 38 and cutting blade 36 at the location of the transition between the longitudinal strips 5 and arc-shaped strips 6. That is to say, a section of cutting blade is then missing at this location. As an alternative to this, it is also possible to make notches in the cutting blade at the location of the connection rather than making a cut-out between the transition from the cutting blades 38 and 36. This alternative arrangement is shown diagrammatically in FIG. 6. In this FIG. 38' is the cutting blade for the boundary line between two adjacent elastic bands 6 and the notches are indicated by 39. Said notches produce thread-like connecting sections 40 at the location of the join. Said thread-like connecting sections 40 are thus pieces of material which have not been cut away. The two elastic bands 6 shown in FIG. 6 are shown pulled apart somewhat at the left, in order to make said thread-like connecting sections 40 visible.

FIG. 3 shows a variant of an embodiment of a chain of elastic bands 50 according to the invention. Said chain of elastic bands 50 is made up of elastic bands 3 with longitudinal strips 5 and arc-shaped strips 6. A front elastic band 2 separated off along the pre-formed tear line 33 is also shown. Said chain of elastic bands 50 differs from the chains of elastic bands shown in FIGS. 1 and 2 essentially in that the longitudinal axis 51 of each longitudinal band 5 is at an angle β of about 2.6° with respect to the transverse direction A of the chain of elastic bands 50 extending in direction C.

A chain of elastic bands 50 of this type having elastic bands 3 oriented obliquely can be produced by means of a so-called roller pair, in which case, referring to FIG. 2, the cutting blades must then be fitted obliquely with respect to the longitudinal direction (axis of rotation) of the cutting roller 31. With regard to the blades 38, and the parts of blade 37 extending in the transverse direction, this implies that these must be arranged at an angle β with respect to the longitudinal axis of the cutting roller. Fitting the cutting blades obliquely in this way promotes a cutting action of the cutting roller 31 in the sheet of elastic material 9 during rotation of the cutting roller 31. As a result, good, reliable cutting through of the sheet 9 of elastic material is ensured. When the cutting blades are fitted in accordance with FIG. 2, the blades 38 and those parts of blade 37 which extend in the transverse direction will essentially be pressed into the sheet 9 of elastic material. When this pressing in takes place, the cutting action is not optimum, as a result of which the accuracy and reliability with which the chain of elastic bands is produced can leave something to be desired.

If the angle β chosen is too large, the chain of elastic bands will be less easy to handle for subsequent use, such as, for example, in a bundling installation or a separating device according to the invention. An angle β of between 0° and 10° is sufficient to provide good cutting results. However, the angle β can in general confidently be taken as less than 5°. An angle of about 2.5° is found to lead to good results and also still to produce an easily handled chain of elastic bands.

FIG. 4 shows, as a further variant, a chain of elastic bands 60. This chain of elastic bands is made up of "banana-shaped" elastic bands 63, one of which, indicated by 62, is shown after separation. Said chain of elastic bands 60 having banana-shaped elastic bands 63 differs from the elastic bands from the chains of elastic bands in FIGS. 1, 2 and 3 essentially in that the longitudinal strips are arc-shaped. The arc-shaped longitudinal strips 64 are joined to one another by means of arc-shaped strips 65 to form a banana-shaped elastic band 63. The boundary line 66 between adjacent elastic bands can be a pre-formed tear line, but can also be a slit which, except for at a few connection points, as in, for example, FIG. 1 and FIG. 6, extends along the complete boundary between the adjacent elastic bands. The cutting effect discussed in relation to FIG. 3 is also promoted with banana-shaped elastic bands of this type. The curvature of the arc-shaped longitudinal strips 64 can be very severe, but can also be relatively slight, as shown.

The radius of curvature M of the outsides of the outermost arc-shaped longitudinal strips is preferably 9 to 13 times the width K of the chain of elastic bands. A radius of curvature of M=11.5K (which approximately corresponds to $\beta$=2.5° in the case of the embodiment in FIG. 3) is found to promote a good cutting effect, whilst the elastic bands and the chain are also easy to handle and to manipulate.

FIG. 5 shows, diagrammatically, a method and device for feeding elastic bands from a chain of elastic bands to a handling installation. In this figure, the chain of elastic bands 70 consists of a multiplicity of elastic bands 71 joined to one another by connections. In this context, the connections can be of diverse types.

The device shown diagrammatically in FIG. 5 functions as follows:

The chain of elastic bands is fed, from a roll which is not shown, by means of a conveyor belt 72 to a separating device, only the gripper pins 73 of which are shown. Stretching of the chain of elastic bands 70 during transport is prevented by the friction between the conveyor belt 72 and the chain of elastic bands. Said stretching could adversely affect the positioning accuracy of the elastic bands in the chain of elastic bands, which could lead to problems during separation.

The conveyor belt 72 is made up of three parallel, individual, conveyor belts 74, 75, 76 which run alongside one another and work in conjunction. At the end located by the separating device, the outermost conveyor belts 74 and 76 extend less far than does the central conveyor belt 75. The central conveyor belt 75 is somewhat narrower than the width of the chain of elastic bands. As shown in FIG. 5, the front elastic band 78 consequently protrudes on either side of the central conveyor belt 75. This provides a possibility for inserting the pins 73 through the cut-out 12 in the front elastic band.

The chain of elastic bands 70 is transported stepwise further over a distance corresponding to the space taken up by an elastic band, viewed in the longitudinal direction of the chain of elastic bands. The chain of elastic bands 70 upstream of the front elastic band 78 is then clamped by means of a clamping block 80. It will be clear that this clamping preferably takes place at the front-but-one elastic band 81. However, for the sake of clarity in the drawing, the clamping block 80 is shown in a different position. The pins 73 are inserted either side of the central conveyor belt 75 through the cut-out 12 in the front elastic band 78 before, at the same time as, or after clamping of the chain of elastic bands. As is indicated by arrows 82 and 83 and by means of broken lines, after this operation the front elastic band 78 is stretched in the transverse direction of the chain of elastic bands (arrows 82) and pulled off the chain of elastic bands and fed to a subsequent handling installation 85 (arrows 83). Tensioning in the transverse direction (arrows 82) and pulling off from the chain (arrows 83) can take place simultaneously or consecutively. The elastic band is fed to a handling installation 85, which in this figure is shown diagrammatically by means of four so-called spreader pins. The elastic band separated off can be fed to the spreader pins 85 in such a way that said pins can be inserted through the passage 12. With the aid of the so-called spreader pins 85, the elastic band can be spread into diverse shapes, such as rectangular shapes, triangular shapes, trapezium-like shapes, etc., and fitted around a product to be bundled.

Figure 7:
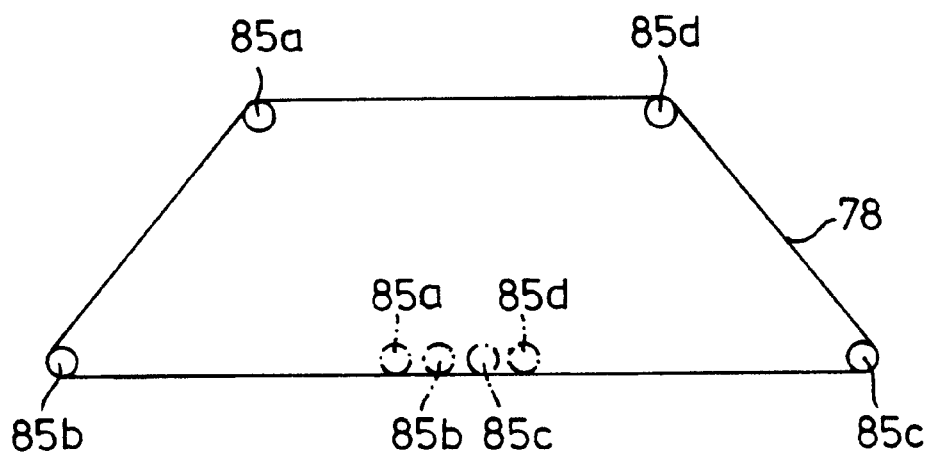
FIG. 7 shows, diagrammatically, part of the functioning of a bundling installation.

FIG. 7 shows, diagrammatically, part of the functioning of the spreader pins 85. In this figure the initial position in FIG. 5 is shown by broken lines and a position in which the elastic band 78 has been spread into a trapezium shape is shown by unbroken lines. To this end, the pins 85a and 85d move sideways and upwards and the pins 85b and 85c are moved apart sideways only. Because the pins 85b and 85c are moved apart sideways only, a fixed reference line passing through the pins 85b and 85c is obtained, which simplifies the control for automatically placing the spread elastic band 78 around a product. The pins 85a and 85d can move sideways and upwards simultaneously, but can also first move upwards and then sideways, or first move sideways and then upwards. It will be clear that the elastic band 78 can be spread into diverse shapes by adjusting the movements of the spreader pins 85 differently, optionally asymmetrically.

Because the front-but-one elastic band 81 is clamped by the clamping block 80 during separation, a tearing effect along the boundary line 89 between the front elastic band 78 and the front-but-one elastic band 81 will take place during stretching of the front elastic band 78 in the direction of arrows 82. If the stretch in the direction of arrows 82 is not too great, said tearing effect will be restricted to the boundary line 89, i.e. to the connections herein, and promote proper separation of the front elastic band, because too great a stretch in the longitudinal direction of the chain of elastic bands, and thus a resilient effect when the front elastic band comes away, is prevented.

It will be clear that many variants of the chain of elastic bands, the production thereof and the use thereof are conceivable without going beyond the scope of the invention. For instance, the elastic bands in a chain of elastic bands can extend in the longitudinal direction of the chain of elastic bands, but, as indicated, the elastic bands preferably extend essentially in the transverse direction thereof. The shape of the elastic bands and the type of connection between adjacent elastic bands can vary.

We claim:

1. Chain of elastic bands (1, 30, 50, 70), comprising a multiplicity of elastic bands (3, 63, 71), each forming an endless loop enclosing a middle through passage (12), in which adjacent elastic bands are joined to one another by means of at least one connection (4, 33, 89), wherein the chain of elastic bands (1, 30, 50, 70) is formed in a flat, sheet-like web (9) of elastic material, and wherein the at least one connection is one of tearable and breakable.

2. Chain according to claim 1, wherein the at least one connection is an attenuated part.

3. Chain of elastic bands according to claim 1, wherein a length of the at least one connection in a longitudinal direction of the chain of elastic bands is less than 5 mm.

4. Chain of elastic bands according to claim 1, wherein a longitudinal direction (A) of the multiplicity of elastic bands (3, 63, 71) extends essentially transversely to a longitudinal direction (C) of the chain of elastic bands (1, 30, 50, 70).

5. Chain of elastic bands according to claim 1, wherein each of the elastic bands (3, 63, 71) is in the shape of two parallel longitudinal strips (5, 64) spaced apart, and joined to one another at their ends by two curved strips (6, 65) in the shape of a circular arc.

6. Chain of elastic bands according to claim 5, wherein the longitudinal strips (5) are straight and a longitudinal axis (51) of each the longitudinal strips (5) intersects a transverse direction (A) of the elastic bands at an angle ($\beta$) of about 0° to 10°.

7. Chain of elastic bands according to claim 5, wherein the longitudinal strips (64) are arc-shaped and the longitudinal strips of adjacent elastic bands run parallel.

8. Chain of elastic bands according to claim 7, wherein a radius of curvature (M) of the arc-shaped longitudinal strips is approximately 10 to 13 times a width (K) of the chain of elastic bands.

9. Chain of elastic bands according to claim 5, wherein the at least one connection is located at a transition between the adjacent longitudinal strips (5, 64) and the curved strips (6, 65).

10. Chain of elastic bands according to claim 9, comprising plural of the connections, with one of plural connections being between the mid-points of the adjacent longitudinal strips (5, 64) of two of the adjacent elastic bands.

11. Chain of elastic bands according to claim 1, wherein the at least one connection comprises a multiplicity of thread-like connecting sections (40).

12. Chain of elastic bands according to claim 1, wherein the at least one connection (4, 33, 89) comprises a pre-formed tear line.

13. Chain of elastic bands according to claim 5, wherein the at least one connection (4, 33, 89) consists of a tear line formed between two of the adjacent longitudinal strips (5, 64) of adjacent elastic bands.

14. Chain of elastic bands according to claim 1, wherein the sheet-like web (9) of elastic material is one of a natural rubber, synthetic rubber and an elastic plastic.

15. Chain of elastic bands according to claim 1, wherein the elastic bands (3, 63, 71) have a constant width (B) all round.

16. Chain of elastic bands according to claim 1, wherein the chain of elastic bands is rolled up into a roll.

17. Chain of elastic bands according to claim 1, wherein the chain of elastic bands is folded up in a harmonica-like manner to form a stack.

18. Method of producing a chain of elastic bands according to claim 1, comprising the following steps:

feeding a sheet of elastic material (9) to a cutting device (10, 35); and cutting out a multiplicity of elastic bands, joined by connections to form a chain (1, 30, 50, 70), from the sheet using a cutting device.

19. Method according to claim 18, wherein the connections (4, 33, 89) are formed by partially cutting through the sheet (9) in the direction perpendicular thereto, at the location of a boundary line between two adjacent elastic bands.

20. Method according to claim 18, wherein the connections are formed by leaving bridging pieces free between two adjacent elastic bands.

21. Method according to claim 18, wherein the cutting device is a punching device (10).

22. Method according to claim 18, wherein the cutting device comprises a roller pair (35) which has a roller (31) provided with cutting blades (36, 37, 38) and a pressure roller (32) interacting therewith.

23. Method according to claim 22, wherein the cutting blades (38') for cutting through the boundary line between two adjacent elastic bands are provided with notches (39) in such a way that thread-like connecting sections (40) are formed at the location of the connections.

24. Method according to claim 22, wherein at least a section of each cutting blade (38) for cutting the boundary line (13, 33, 66, 89) between two adjacent elastic bands has a smaller cutting depth with respect to the other cutting blades, such that the sheet (9) is not completely cut through at the location of the cutting blade which has the smaller cutting depth.

25. Method according to claim 22, wherein the sheet of elastic material is produced by means of an extrusion device and after having been produced is fed from the extrusion device to the cutting device.

26. Method according to claim 25, wherein the waste produced during cutting out is fed back to the extrusion device.

27. Method according to claim 18, wherein the chain of elastic bands produced is wound into a roll by a rolling device to which it is fed by means of a conveyor belt.

* * * * *